(12) United States Patent
Shibata

(10) Patent No.: US 11,462,748 B2
(45) Date of Patent: Oct. 4, 2022

(54) METHOD OF MANUFACTURING FUEL CELL SEPARATOR

(71) Applicant: Toyota Jidosha Kabushiki Kaisha, Toyota (JP)

(72) Inventor: Kazunori Shibata, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 328 days.

(21) Appl. No.: 16/233,340

(22) Filed: Dec. 27, 2018

(65) Prior Publication Data

US 2019/0237775 A1 Aug. 1, 2019

(30) Foreign Application Priority Data

Jan. 26, 2018 (JP) .............................. JP2018-011796

(51) Int. Cl.
| *H01M 8/0254* | (2016.01) |
| *H01M 8/0267* | (2016.01) |
| *H01M 8/0206* | (2016.01) |

(52) U.S. Cl.
CPC ....... *H01M 8/0254* (2013.01); *H01M 8/0206* (2013.01); *H01M 8/0267* (2013.01)

(58) Field of Classification Search
CPC . H01M 8/0254; H01M 8/0206; H01M 8/0267
See application file for complete search history.

(56) References Cited

U.S. PATENT DOCUMENTS

| 2003/0064277 A1* | 4/2003 | Sugiura | H01M 8/0258 |
| | | | 429/434 |
| 2004/0053099 A1* | 3/2004 | Franklin | H01M 8/0247 |
| | | | 429/437 |
| 2016/0072135 A1* | 3/2016 | Okamoto | H01M 8/0297 |
| | | | 429/535 |
| 2017/0084929 A1* | 3/2017 | Xu | H01M 8/0276 |

(Continued)

FOREIGN PATENT DOCUMENTS

| JP | 2009-064593 A | 3/2009 |
| JP | 2009-187757 A | 8/2009 |
| JP | 2017-130437 A | 7/2017 |

(Continued)

*Primary Examiner* — Stewart A Fraser
*Assistant Examiner* — Brent C Thomas
(74) *Attorney, Agent, or Firm* — Dinsmore & Shohl LLP

(57) ABSTRACT

A method of manufacturing a fuel cell separator, includes: stacking a first separator plate and a second separator plate having first and second protruding portions so that the first and second protruding portions protrude in a direction away from the first separator plate, the first and second protruding portions being adjacent to both sides of a first junction portion to be joined to the first separator plate; pressing the first and second protruding portions toward the first separator plate so that the first junction portion is pressed against the first separator plate; and joining the first junction portion to the first separator plate while the first junction portion is being pressed against the first separator plate, wherein in the pressing, the first junction portion is pressed against the first separator plate by elastic deformation of a first bent portion bent between the first junction portion and the first protruding portion.

12 Claims, 7 Drawing Sheets

(56) References Cited

U.S. PATENT DOCUMENTS

2017/0141413 A1* 5/2017 Poirot-Crouvezier ................... H01M 8/0267
2018/0226663 A1* 8/2018 Ishida ................. H01M 8/0206

FOREIGN PATENT DOCUMENTS

| JP | 2017-204385 A | 11/2017 |
| WO | 2014185193 A1 | 11/2014 |

* cited by examiner

METHOD OF MANUFACTURING FUEL CELL SEPARATOR

CROSS-REFERENCE TO RELATED APPLICATION

This application is based upon and claims the benefit of priority of the prior Japanese Patent Application No. 2018-011796, filed on Jan. 26, 2018, the entire contents of which are incorporated herein by reference.

TECHNICAL FIELD

The present disclosure relates to a method of manufacturing a fuel cell separator.

BACKGROUND

A fuel cell includes a Membrane Electrode Gas Diffusion Layer Assembly (MEGA) and a separator. The separator is manufactured by joining an anode-side separator plate to a cathode-side separator plate. For example, welding has been known as a method of joining separator plates as disclosed in, for example, Japanese Patent Application Publication No. 2009-187757.

SUMMARY

It is therefore an object of the present disclosure to provide a method of manufacturing a fuel cell separator capable of improving the junction state of separator plates.

According to an aspect of the present disclosure, there is provided a method of manufacturing a fuel cell separator, the method including: stacking a first separator plate and a second separator plate that has a first protruding portion and a second protruding portion so that the first protruding portion and the second protruding portion protrude in a direction away from the first separator plate, the first protruding portion and the second protruding portion being adjacent to both sides of a first junction portion to be joined to the first separator plate; pressing the first protruding portion and the second protruding portion toward the first separator plate so that the first junction portion is pressed against the first separator plate; and joining the first junction portion to the first separator plate while the first junction portion is being pressed against the first separator plate, wherein in the pressing, the first junction portion is pressed against the first separator plate by elastic deformation of a first bent portion that is bent between the first junction portion and the first protruding portion.

DETAILED DESCRIPTION

The contact face where the separator plates are in contact with each other at the time of joining does not become an ideal flat surface due to, for example manufacturing error, and a gap may be formed between the separator plates because of the presence of fine irregularity, warpage, and undulation. Thus, in a part where a large gap is formed between the separator plates, the separator plates are not sufficiently joined, and the separator plates may be defectively joined. When the separator plates are defectively joined, the contact resistance between the separators increases, and thereby, the power generation performance of the fuel cell may decrease.

Figure 1:
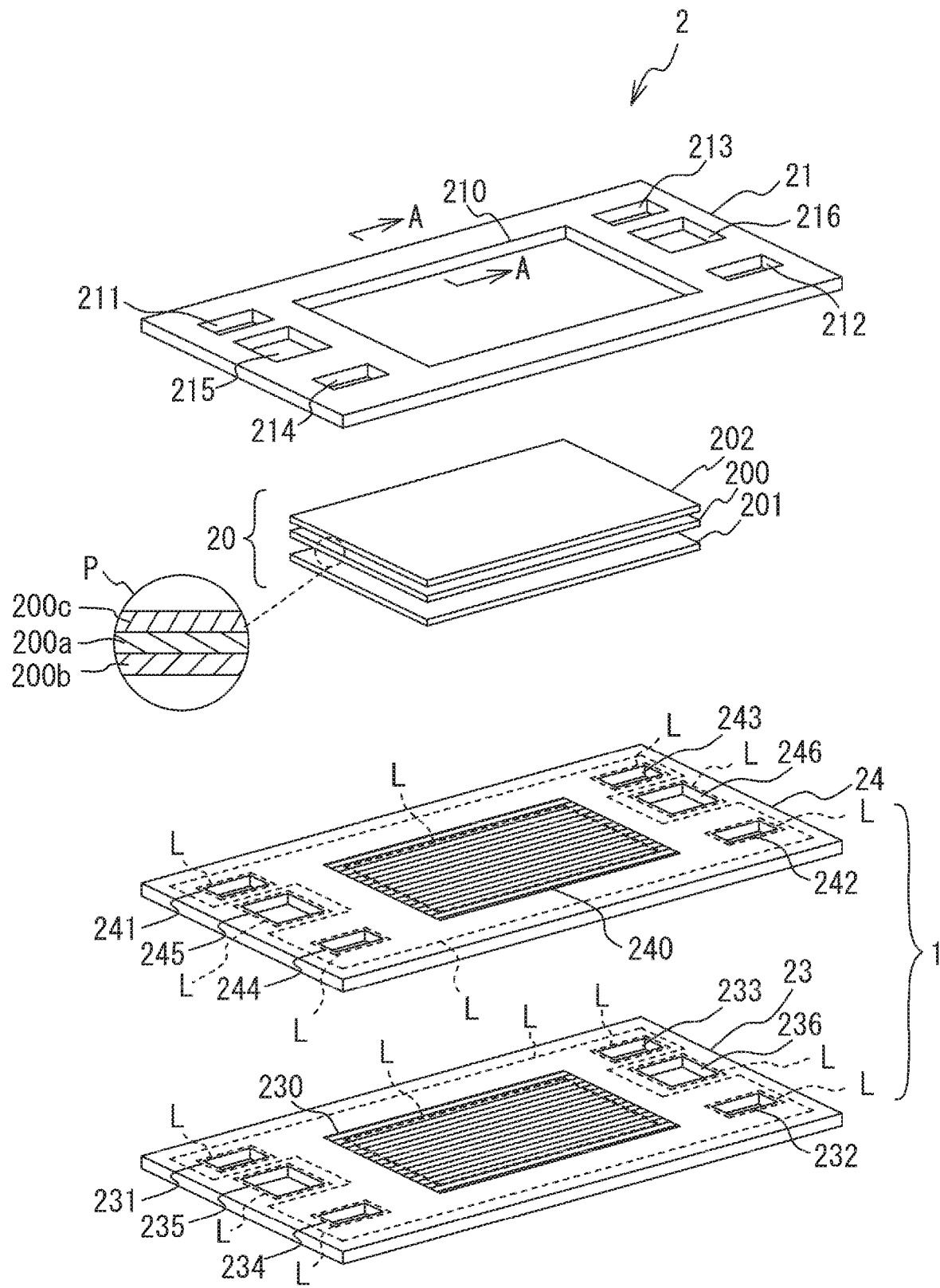
FIG. 1 is an exploded perspective view illustrating a unit cell of a fuel cell.

FIG. 1 is an exploded perspective view illustrating a unit cell 2 of a fuel cell. The fuel cell is used in, for example, fuel cell vehicles, but its application is not limited.

The fuel cell is a solid high polymer fuel cell, and is structured to include a fuel cell stack in which a plurality of the unit cells 2 are stacked. In addition, the fuel cell includes a cathode-side inlet manifold, a cathode-side outlet manifold, an anode-side inlet manifold, an anode-side outlet manifold, a cooling medium inlet manifold, and a cooling medium outlet manifold, which penetrate through the unit cells 2 in the stacking direction.

An oxidant gas to be supplied to each unit cell 2 flows through the cathode-side inlet manifold. An oxidant off-gas exhausted from each unit cell 2 flows through the cathode-side outlet manifold. A fuel gas to be supplied to each unit cell 2 flows through the anode-side inlet manifold. A fuel off-gas exhausted from each unit cell 2 flows through the anode-side outlet manifold. A cooling medium such as cooling water to be supplied to each unit cell 2 flows through the cooling medium inlet manifold. A cooling medium exhausted from each unit cell 2 flows through the cooling medium outlet manifold.

The unit cell 2 is supplied with a fuel gas (e.g., hydrogen) and an oxidant gas (e.g., oxygen in the air) to produce electricity by electrochemical reactions between the fuel gas and the oxidant gas. The unit cell 2 includes an MEGA 20, a frame 21, and a separator 1 arranged in the stacking direction of the unit cells 2.

The MEGA 20 includes a Membrane Electrode Assembly (MEA) 200, and a pair of Gas Diffusion Layers (GDLs) 201 and 202 sandwiching the MEA 200. The reference character P indicates the stacking structure of the MEA 200. The MEA 200 includes an electrolyte membrane 200a, and an anode catalyst layer 200b and a cathode catalyst layer 200c sandwiching the electrolyte membrane 200a.

The electrolyte membrane 200a includes, for example, an ion exchange resin film exhibiting high proton conductivity under wet conditions. Examples of such an ion exchange resin film include, but are not limited to, a fluorine resin-based film having a sulfonate group as an ion-exchange group, such as Nafion (registered trademark).

Each of the anode catalyst layer 200b and the cathode catalyst layer 200c is formed as a porous layer containing catalyst-supporting conductive particles and proton conductive electrolytes and having gas diffusibility. For example, the anode catalyst layer 200b and the cathode catalyst layer 200c are formed as a dried coating film made from a catalyst ink that is a dispersion solution containing platinum-supporting carbons and proton conductive electrolytes.

The anode catalyst layer 200b is supplied with a fuel gas through the first gas diffusion layer 201, while the cathode catalyst layer 200c is supplied with an oxidant gas through the second gas diffusion layer 202. The gas diffusion layers 201 and 202 are formed by, for example, stacking a water-repellent microporous layer on a base material such as carbon paper. The microporous layer is formed so as to contain, for example, water-repellent resin such as polytetrafluoroethylene (PTFE) and a conductive material such as carbon black. The MEA 200 produces electricity by electrochemical reactions using the oxidant gas and the fuel gas.

The frame 21 is formed of, for example, a resin sheet having a rectangular outer shape. Examples of the material for the frame 21 include, but are not limited to, Polyethylene Terephthalate (PET)-based resin, Syndiotactic Polystyrene (SPS)-based resin, and Polypropylene (PP)-based resin. The frame 21 has a frame shape, and a rectangular opening 210 is located in the center portion.

Additionally, through holes 211 through 216 penetrating through the frame 21 in the thickness direction are located in the ends of the frame 21. The opening 210 is located at the position corresponding to the MEGA 20, and the outer peripheral end of the MEA 200 is adhesively joined to the rim of the opening 210 through an adhesion layer. This structure fixes the MEA 200 to the frame 21.

The through holes 211, 215, and 214 are located at a first end of the frame 21, and the through holes 213, 216, and 212 are located at a second end of the frame 21. The through holes 211 through 216 respectively overlap with through holes 231 through 236 of a separator plate 23 and through holes 241 through 246 of a separator plate 24.

The through hole 211 is a part of the anode-side inlet manifold, and a fuel gas flows through the through hole 211 in the stacking direction of the unit cells 2. The through hole 212 is a part of the anode-side outlet manifold, and a fuel off-gas flows through the through hole 212 in the stacking direction of the unit cells 2.

The through hole 213 is a part of the cathode-side inlet manifold, and an oxidant gas flows through the through hole 213 in the stacking direction of the unit cells 2. The through hole 214 is a part of the cathode-side outlet manifold, and an oxidant off-gas flows through the through hole 214 in the stacking direction of the unit cells 2.

The through hole 216 is a part of the cooling medium inlet manifold, and a cooling medium flows through the through hole 216 in the stacking direction of the unit cells 2. The through hole 215 is a part of the cooling medium outlet manifold, and a cooling medium flows through the through hole 215 in the stacking direction of the unit cells 2.

The separator 1 includes a pair of the separator plates 23 and 24. One of the separator plates 23 and 24 is an example of a first separator plate, and the other of the separator plates 23 and 24 is an example of a second separator plate. In the following description, for convenience sake, the separator plate 23 is assumed to be the first separator plate, and the separator plate 24 is assumed to be the second separator plate.

The separator plates 23 and 24 are made of, for example, metal plates, and have rectangular outer shapes. The separator plates 23 and 24 are joined to each other by, for example, laser welding, and the separator plate 24 is adhesively joined to the frame 21 by adhesive. Accordingly, in the fuel cell, the separator plate 24 is arranged at the anode side of the MEGA 20 of the unit cell 2 including the separator plate 24, and the separator plate 23 is arranged at the cathode side of the MEGA 20 of another unit cell 2 adjacent to the unit cell 2 including the separator plate 23.

The separator plate 24 has the through holes 241 through 246 penetrating through the separator plate 24 in the thickness direction, and a corrugated anode passage portion 240. The through holes 241, 245, and 244 are located at a first end of the separator plate 24, while the through holes 243, 246, and 242 are located at a second end of the separator plate 24.

A groove-shaped fuel gas passage, through which a fuel gas flows, is formed on the surface closer to the MEGA 20 of the anode passage portion 240. The fuel gas passage faces the gas diffusion layer 201, and a fuel gas is supplied from the fuel gas passage to the gas diffusion layer 201. The anode passage portion 240 is formed by bending with use of a press metal die, for example. The fuel gas passage may be formed in, for example, a linear shape, or a meander shape.

The separator plate 23 has the through holes 231 through 236 and a corrugated cathode passage portion 230. The through holes 231, 235, and 234 are located at a first end of the separator plate 23, while the through holes 233, 236, and 232 are located at a second end of the separator plate 23.

A groove-shaped cooling medium passage, through which a cooling medium flows, is formed on the surface closer to the separator plate 24 of the cathode passage portion 230, and a groove-shaped oxidant gas passage, through which an oxidant gas flows, is formed on the surface closer to the adjacent unit cell 2 of the cathode passage portion 230. The oxidant gas passage faces the gas diffusion layer 202 of the MEGA 20 of the adjacent unit cell 2, and an oxidant gas is supplied from the oxidant gas passage to the gas diffusion layer 202.

The cathode passage portion 230 is formed by, for example, bending with use of a press metal die. The cooling medium passage and the fuel gas passage may be formed in, for example, linear shapes or meander shapes. The separator plates 23 and 24 are not necessarily made of metal, and may be formed by carbon molding. In addition, a groove-shaped cooling medium passage, through which a cooling medium flows, may be formed on the surface facing the separator plate 24 in the cathode passage portion 230 of the separator plate 23.

The through holes 231 and 241 are part of the anode-side inlet manifold, and a fuel gas flows through the through holes 231 and 241 in the stacking direction of the unit cells 2. The through holes 232 and 242 are part of the anode-side outlet manifold, and a fuel off-gas flows through the through holes 232 and 242 in the stacking direction of the unit cells 2.

The through holes 241 and 242 are connected to the fuel gas passage. A fuel gas is supplied from the through hole 241 to the MEGA 20 through the fuel gas passage. A fuel off-gas is exhausted from the MEGA 20 to the through hole 242 through the fuel gas passage.

The through holes 233 and 243 are part of the cathode-side inlet manifold, and an oxidant gas flows through the through holes 233 and 243 in the stacking direction of the unit cells 2. The through holes 234 and 244 are part of the cathode-side outlet manifold, and an oxidant off-gas flows through the through holes 234 and 244 in the stacking direction of the unit cells 2.

An oxidant gas is supplied from the through hole 233 to the MEGA 20 through the oxidant gas passage. In addition, an oxidant off-gas is exhausted from the MEGA 20 to the through hole 234 through the oxidant gas passage.

The through holes 236 and 246 are part of the cooling medium inlet manifold, and a cooling medium flows through the through holes 236 and 246 in the stacking direction of the unit cells 2. The through holes 235 and 245 are part of the cooling medium outlet manifold, and a cooling medium flows through the through holes 235 and 245 in the stacking direction of the unit cells 2.

A cooling medium flows from the through hole 236 into the through hole 235 through the cooling medium passage. Accordingly, the cooling medium cools the fuel cell.

The separator plates 23 and 24 are laser welded along weld lines L. The weld lines L are set around each of the through holes 231 through 236 and 241 through 246 and in the peripheral portions (i.e., inside the power generation portion) of the anode passage portion 240 and the cathode passage portion 230. Furthermore, the weld line L is set so as to surround the anode passage portion 240, the cathode passage portion 230, and the through holes 231 through 234 and 241 through 244. The setting of the weld line L is not limited, and for example, the weld line L may be set in a part other than the above-described parts to improve the seal performance of the separator plates 23 and 24 or to improve the power generation performance by reducing the contact resistance between the separator plates 23 and 24 by making the separator plates 23 and 24 stick to each other.

The separator plates 23 and 24 have protruding portions along the weld lines L to improve the junction state due to laser welding. Hereinafter, the structures of the separator plates 23 and 24 will be described with reference to the cross-sectional view taken along line A-A.

Figure 2:
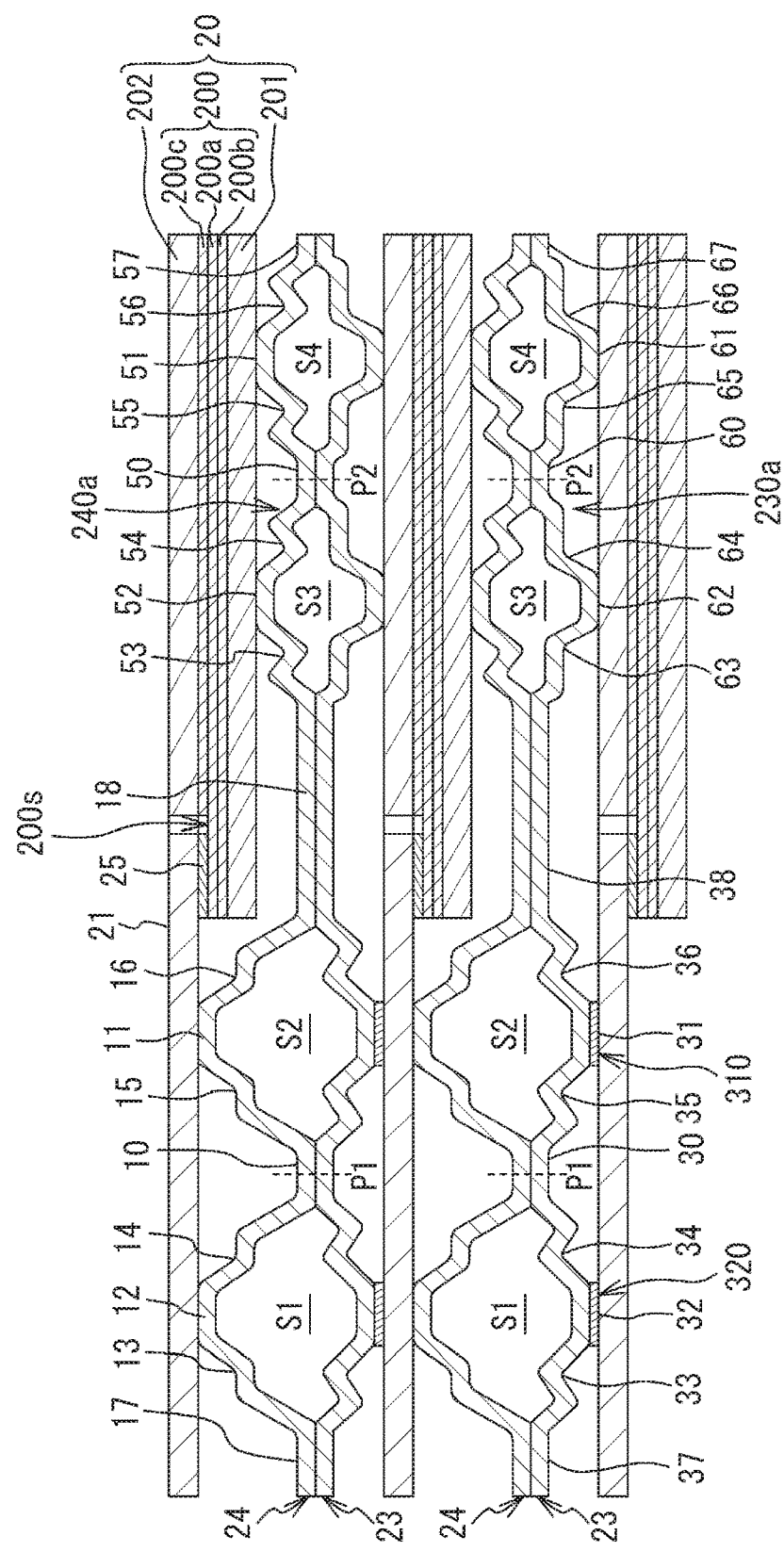
FIG. 2 is a cross-sectional view illustrating the fuel cell.

FIG. 2 is a cross-sectional view illustrating the fuel cell. The cross-sectional view illustrates the cross-sections taken along line A-A of the two unit cells 2 adjacent to each other.

The gas diffusion layer 202 is located in the opening 210 of the frame 21. The MEA 200 and the gas diffusion layer 201 are stacked under the gas diffusion layer 202. The anode catalyst layer 200b is formed on a first surface of the MEA 200, and the cathode catalyst layer 200c is formed on a second surface of the MEA 200. Since the area of the cathode catalyst layer 200c is less than the areas of the electrolyte membrane 200a and the anode catalyst layer 200b, a peripheral region 200s of the electrolyte membrane 200a is exposed from the cathode catalyst layer 200c. The peripheral region 200s is provided so as to surround the periphery of the cathode catalyst layer 200c when the upper surface of the MEA 200 is viewed from the front.

The peripheral region 200s adheres to the end closer to the opening 210 of the frame 21 through an adhesion layer 25. The adhesion layer 25 is formed of, for example, ultraviolet curable resin or thermoset resin. The MEGA 20 adheres to the frame 21 in the above-described manner.

A pair of the separator plates 23 and 24 is sandwiched between the MEGA 20 and the frame 21 of one unit cell 2 and the MEGA 20 and the frame 21 of another unit cell 2 adjacent to the one unit cell 2. The reference characters P1 and P2 indicate the positions corresponding to the weld lines L of the separator plates 23 and 24 (welding points). The welding point P1 is located between the frames 21 of the unit cells 2 adjacent to each other, and the welding point P2 is located between the gas diffusion layer 201 of the unit cell 2 and the gas diffusion layer 202 of the adjacent unit cell 2.

The separator plate 24 includes a junction portion 10 including the welding point P1, protruding portions 11 and 12, bent portions 13 through 16, and flat portions 17 and 18, and includes a junction portion 50 including the welding point P2, protruding portions 51 and 52, bent portions 53 through 56, and a flat portion 57. The separator plate 23 includes a junction portion 30 including the welding point P1, protruding portions 31 and 32, bent portions 33 through 36, and flat portions 37 and 38, and includes a junction portion 60 including the welding point P2, protruding portions 61 and 62, bent portions 63 through 66, and a flat portion 67.

The junction portion 10 of the separator plate 24 and the junction portion 30 of the separator plate 23 are joined to each other by laser welding. The surfaces of the junction portions 10 and 30 are substantially flat, but may be curved as described later. The junction portion 10 is an example of a first junction portion, and the junction portion 30 is an example of a second junction portion.

The protruding portions 11 and 12 are adjacent to both sides of the junction portion 10, and protrude in a direction away from the separator plate 23. Thus, the protruding portions 11 and 12 are in contact with the lower surface of the frame 21. The protruding portions 31 and 32 are adjacent to both sides of the junction portion 30, and protrude in a direction away from the separator plate 24. Thus, the protruding portions 31 and 32 are in contact with the upper surface of the frame 21.

In some embodiments, regions 310 and 320, which are in contact with the frame 21, of the protruding portions 31 and 32, which are not to be adhesively joined to the frame 21, of the separator plate 23 are coated by, for example, rubber to improve the seal performance between the frames 21 of the unit cells 2 adjacent to each other. Alternatively, even when the regions 310 and 320 are not coated by, for example, rubber, if the frame 21 is elastic, the sealing between the frame 21 and the separator plate 23 is possible by the protruding portions 31 and 32 being in contact with the frame 21. In addition, for example, a cooling medium may flow through a gap S2 between the protruding portions 11 and 31 and a gap S1 between the protruding portions 12 and 32.

The bent portion 14 is located between the junction portion 10 and the protruding portion 12, and is bent so as to elastically deform as the protruding portion 12 is pressed. The bent portion 15 is located between the junction portion 10 and the protruding portion 11, and is bent so as to elastically deform as the protruding portion 11 is pressed. The junction portion 10 is pressed against the junction portion 30 of the separator plate 23 by elastic deformation of the bent portions 14 and 15. One of the protruding portions 11 and 12 is an example of a first protruding portion, and the other of the protruding portions 11 and 12 is an example of a second protruding portion. One of the bent portions 14 and 15 is an example of a first bent portion, and the other of the bent portions 14 and 15 is an example of a second bent portion.

The bent portion 13 is located between the flat portion 17, of which the surface is substantially flat, and the protruding portion 12, and is bent so as to elastically deform as the protruding portion 12 is pressed. The bent portion 16 is located between the flat portion 18, of which the surface is substantially flat, and the protruding portion 11, and is bent so as to elastically deform as the protruding portion 11 is pressed. The flat portions 17 and 18 are respectively pressed against the flat portions 37 and 38 of the separator plate 23 by elastic deformation of the bent portions 13 and 16.

The bent portion 34 is located between the junction portion 30 and the protruding portion 32, and is bent so as to elastically deform as the protruding portion 32 is pressed. The bent portion 35 is located between the junction portion 30 and the protruding portion 31, and is bent so as to elastically deform as the protruding portion 31 is pressed. The junction portion 30 is pressed against the junction portion 10 of the separator plate 24 by elastic deformation of the bent portions 34 and 35. One of the protruding portions 31 and 32 is an example of a third protruding portion, and the other of the protruding portions 31 and 32 is an example of a fourth protruding portion. One of the bent portions 34 and 35 is an example of a third bent portion, and the other of the bent portions 34 and 35 is an example of a fourth bent portion.

The bent portion 33 is located between the flat portion 37, of which the surface is substantially flat, and the protruding portion 32, and is bent so as to elastically deform as the protruding portion 32 is pressed. The bent portion 36 is located between the flat portion 38, of which the surface is substantially flat, and the protruding portion 31, and is bent so as to elastically deform as the protruding portion 31 is pressed. The flat portions 37 and 38 are respectively pressed against the flat portions 17 and 18 of the separator plate 24 by elastic deformation of the bent portions 33 and 36.

Additionally, the junction portion 50 of the separator plate 24 and the junction portion 60 of the separator plate 23 are joined to each other by laser welding. The surfaces of the junction portions 50 and 60 are substantially flat, but may be curved as described later. The junction portion 50 is an example of the first junction portion, and the junction portion 60 is an example of the second junction portion.

The protruding portions 51 and 52 are adjacent to both sides of the junction portion 50, and protrude in the direction away from the separator plate 23. Accordingly, the protruding portions 51 and 52 are in contact with the lower surface of the gas diffusion layer 201. In addition, the protruding portions 61 and 62 are adjacent to both sides of the junction portion 60, and protrude in the direction away from the separator plate 24. Accordingly, the protruding portions 61 and 62 are in contact with the upper surface of the gas diffusion layer 202.

Additionally, the protruding portions 51 and 52 are part of the anode passage portion 240, and the protruding portions 61 and 62 are part of the cathode passage portion 230. A groove portion 240a between the protruding portions 51 and 52 is a part of the fuel gas passage, and a groove portion 230a between the protruding portions 61 and 62 is a part of the oxidant gas passage. A gap S3 between the protruding portions 52 and 62 and a gap S4 between the protruding portions 51 and 61 are part of the cooling medium passage.

The bent portion 54 is located between the junction portion 50 and the protruding portion 52, and is bent so as to elastically deform as the protruding portion 52 is pressed. The bent portion 55 is located between the junction portion 50 and the protruding portion 51, and is bent so as to elastically deform as the protruding portion 51 is pressed. The junction portion 50 is pressed against the junction portion 60 of the separator plate 23 by elastic deformation of the bent portions 54 and 55. One of the protruding portions 51 and 52 is an example of the first protruding portion, and the other of the protruding portions 51 and 52 is an example of the second protruding portion.

The bent portion 53 is located between the flat portion 18 and the protruding portion 52, and is bent so as to elastically deform as the protruding portion 52 is pressed. The bent portion 56 is located between the flat portion 57, of which the surface is substantially flat, and the protruding portion 51, and is bent so as to elastically deform as the protruding portion 51 presses. The flat portions 18 and 57 are respectively pressed against the flat portions 38 and 67 of the separator plate 23 by elastic deformation of the bent portions 53 and 56.

The bent portion 64 is located between the junction portion 60 and the protruding portion 62, and is bent so as to elastically deform as the protruding portion 62 is pressed. The bent portion 65 is located between the junction portion 60 and the protruding portion 61, and is bent so as to elastically deform as the protruding portion 61 is pressed. The junction portion 60 is pressed against the junction portion 50 of the separator plate 24 by elastic deformation of the bent portions 64 and 65. One of the protruding portions 61 and 62 is an example of the third protruding portion, and the other of the protruding portions 61 and 62 is an example of the fourth protruding portion.

The bent portion 63 is located between the flat portion 38 and the protruding portion 62, and is bent so as to elastically deform as the protruding portion 62 is pressed. The bent portion 66 is located between the flat portion 67, of which the surface is substantially flat, and the protruding portion 61, and is bent so as to elastically deform as the protruding portion 61 is pressed. The flat portions 38 and 67 are respectively pressed against the flat portions 18 and 57 of the separator plate 24 by elastic deformation of the bent portions 63 and 66.

Next, a method of manufacturing the separator 1 will be described. The present example describes a case where the junction portion 10 of the separator plate 24 is joined to the junction portion 30 of the separator plate 23. However, the joining method described below is also applied to the case where the junction portion 50 of the separator plate 24 is joined to the junction portion 60 of the separator plate 23.

Figure 3:
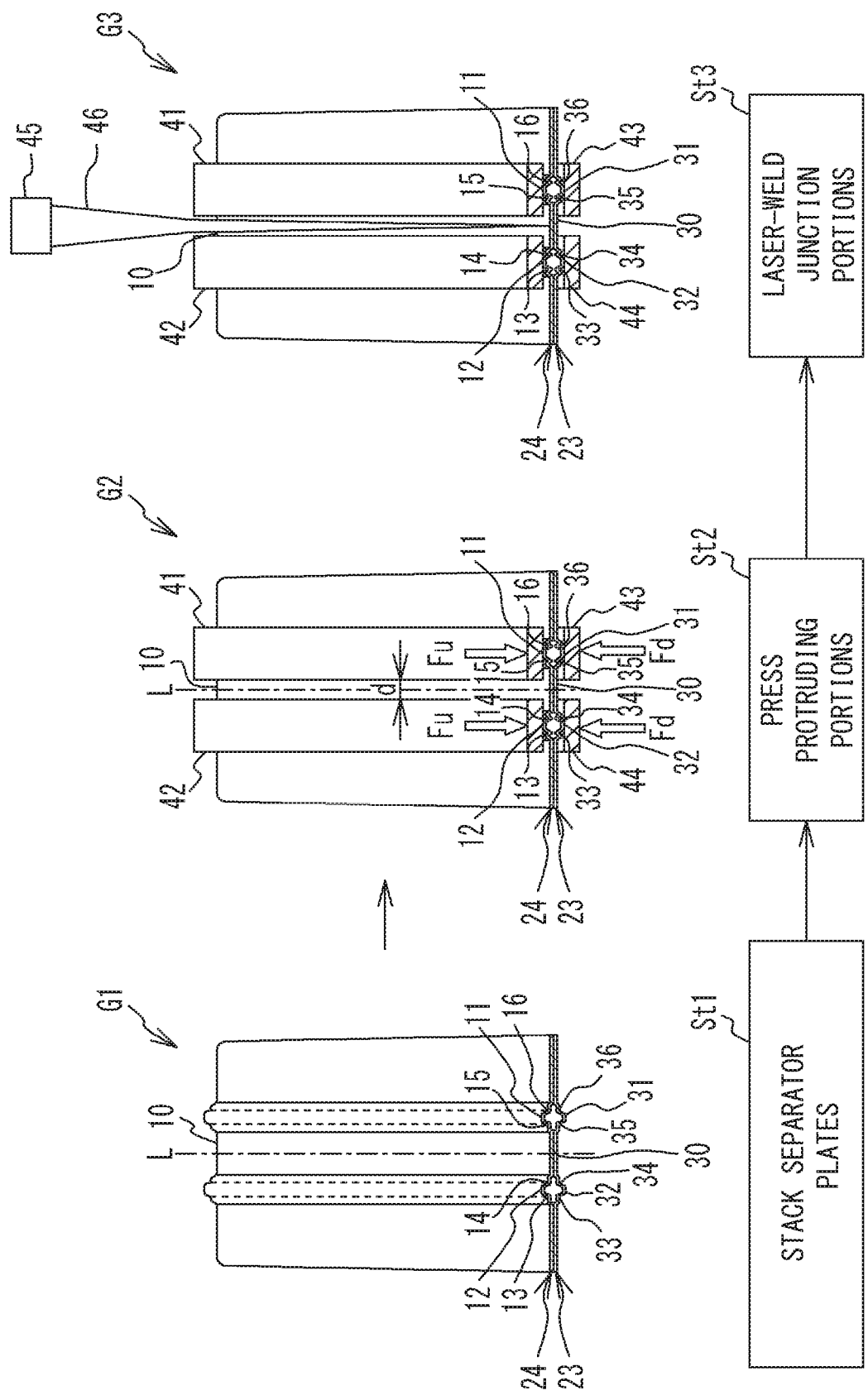
FIG. 3 is a process chart illustrating a method of manufacturing a separator.

FIG. 3 is a process chart illustrating a method of manufacturing the separator 1. In FIG. 3, the same reference characters are affixed to the same elements as those in FIG. 2, and the description thereof is omitted.

As indicated by the reference character G1, the separator plate 23 and the separator plate 24 are stacked (step SU). In this step, the separator plate 24 is stacked so that the protruding portions 11 and 12 protrude in the direction away from the separator plate 23, and the separator plate 23 is stacked so that the protruding portions 31 and 32 protrude in the direction away from the separator plate 24. Accordingly, the protruding portions 11 and 12 of the separator plate 24 face the protruding portions 31 and 32 of the separator plate 23, respectively.

Then, as indicated by the reference character G2, the protruding portions 11 and 12 of the separator plate 24 are pressed toward the separator plate 23, and the protruding portions 31 and 32 of the separator plate 23 are pressed toward the separator plate 24 (step St2).

The junction portion 10 of the separator plate 24 is pressed against the junction portion 30 of the separator plate 23 as the protruding portions 11 and 12 are pressed. In addition, the junction portion 30 of the separator plate 23 is pressed against the junction portion 10 of the separator plate 24 as the protruding portions 31 and 32 are pressed.

At this time, the junction portion 10 of the separator plate 24 is pressed against the junction portion 30 of the separator plate 23 by elastic deformation of the bent portions 14 and 15, and the junction portion 30 of the separator plate 23 is pressed against the junction portion 10 of the separator plate 24 by elastic deformation of the bent portions 34 and 35. The functions of the bent portions 14, 15, 34, and 35 will be described later.

In addition, the protruding portions 11 and 12 of the separator plate 24 are pressed as pressing tools 41 and 42 are pressed against the protruding portions 11 and 12, respectively. The protruding portions 31 and 32 of the separator plate 23 are pressed as pressing tools 43 and 44 are pressed against the protruding portions 31 and 32, respectively. The pressing tools 41 through 44 are members extending along the weld lines L and being substantially rectangular shaped, and are movably provided to the manufacturing device for the separator 1.

The pressing tools 41 and 42 are arranged at a fixed interval d on the protruding portions 11 and 12, and apply appropriate loads Fu to the protruding portions 11 and 12, respectively. The pressing tools 43 and 44 are arranged at the fixed interval d on the protruding portions 31 and 32, and apply appropriate loads Fd to the protruding portions 31 and 32, respectively. In some embodiments, the pressing tools 41 through 44 are formed of a rigid body made of steel, stainless-steel, or the like so as to inhibit the variability in distance between the protruding portions 11 and 31 and the variability in distance between the protruding portions 12 and 32 from increasing due to the elastic deformation of the pressing tools 41 through 44 at the time of pressing.

In this step, it is not always necessary to move the pressing tools 41 through 44 in the pressing direction. The protruding portions 11 and 31 may be pressed by fixing one of the pressing tools 41 and 43, which face each other across the separator plates 23 and 24, and moving only the other one. In the same manner, the protruding portions 12 and 32 may be pressed by fixing one of the pressing tools 42 and 44, which face each other across the separator plates 23 and 24, and moving only the other one.

Then, as indicated by the reference character G3, while the junction portions 10 and 30 are pressed against each other, the junction portions 10 and 30 are laser-welded (step St3). The laser welding is conducted by irradiating the junction portions 10 and 30 with a laser light 46 from a laser emission device 45 along the weld line L. At this time, the laser light 46 passes through the gap of the distance d between the pressing tools 41 and 42 to reach the junction portions 10 and 30.

As described above, the separator plates 23 and 24 are joined to each other. In the present example, since laser welding is used as a method of joining the separator plates 23 and 24, sufficient joint strength is achieved thanks to high power density of the laser welding. However, this does not intend to suggest any limitation, and other welding methods such as ultrasonic welding, electron beam welding, arc welding, and resistance welding may be used. Such welding methods enable to easily join the separator plates 23 and 24 together, but this does not intend to suggest any limitation. A joining method other than welding, such as adhesive joining with use of thermoplastic resin or thermoset resin, adhesive joining by brazing, or cold welding may be used.

Next, a process of pressing the protruding portions 11, 12, 31, and 32 will be described.

Figure 4:
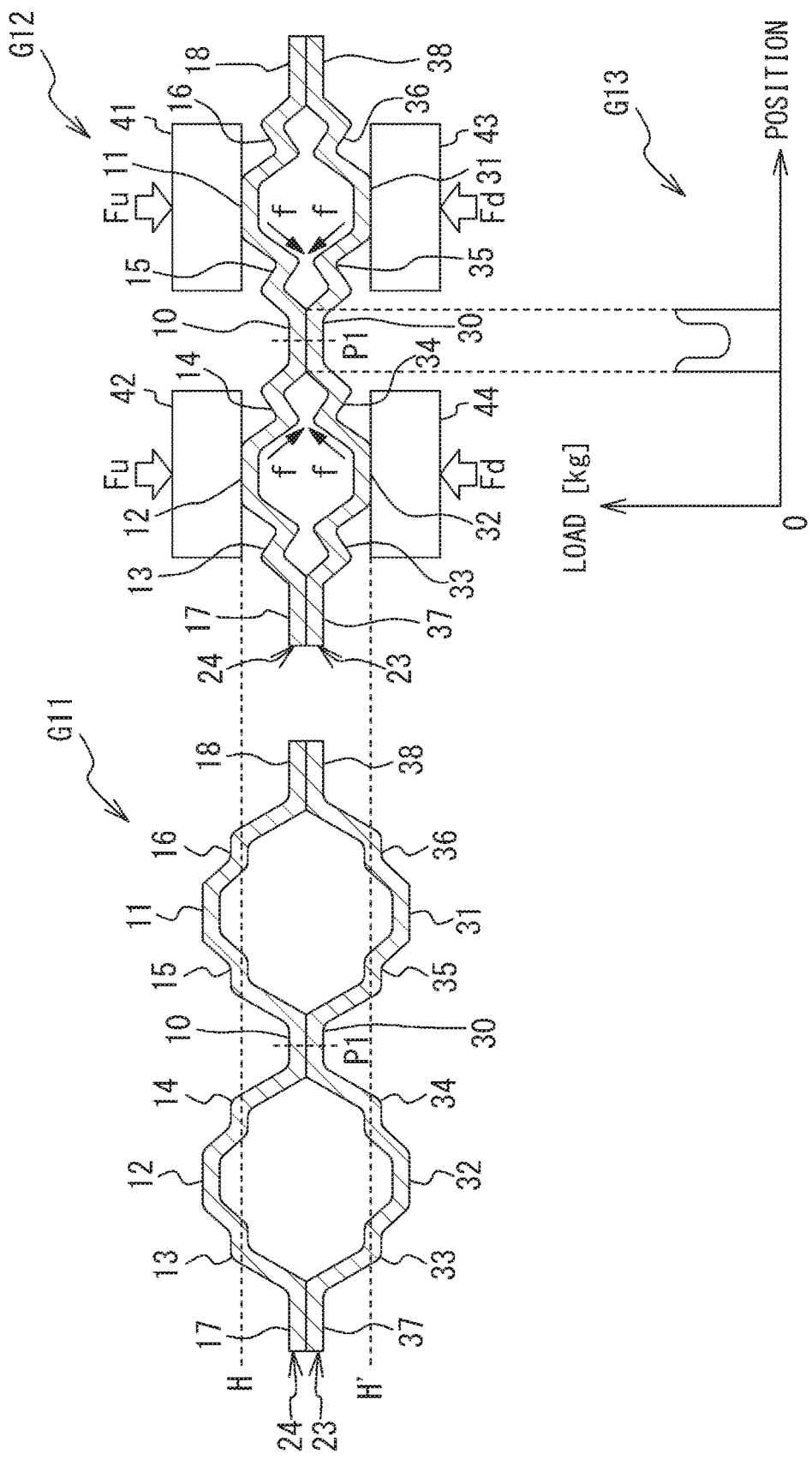
FIG. 4 illustrates a process of pressing a protruding portion in the manufacturing method of the embodiment.

FIG. 4 illustrates a process of pressing the protruding portions 11, 12, 31, and 32 in the manufacturing method of the embodiment. In FIG. 4, the same reference characters are affixed to the same elements as those of FIG. 2 and FIG. 3, and the description thereof is omitted.

The reference character G11 indicates the cross-sections of the separator plates 23 and 24 before the protruding portions 11, 12, 31, and 32 are pressed, and the reference character G12 indicates the cross-sections of the separator plates 23 and 24 when the protruding portions 11, 12, 31, and 32 are pressed. The reference characters H and H' indicate the height positions of the protruding portions 11, 12, 31, and 32 after pressing.

Figure 5:
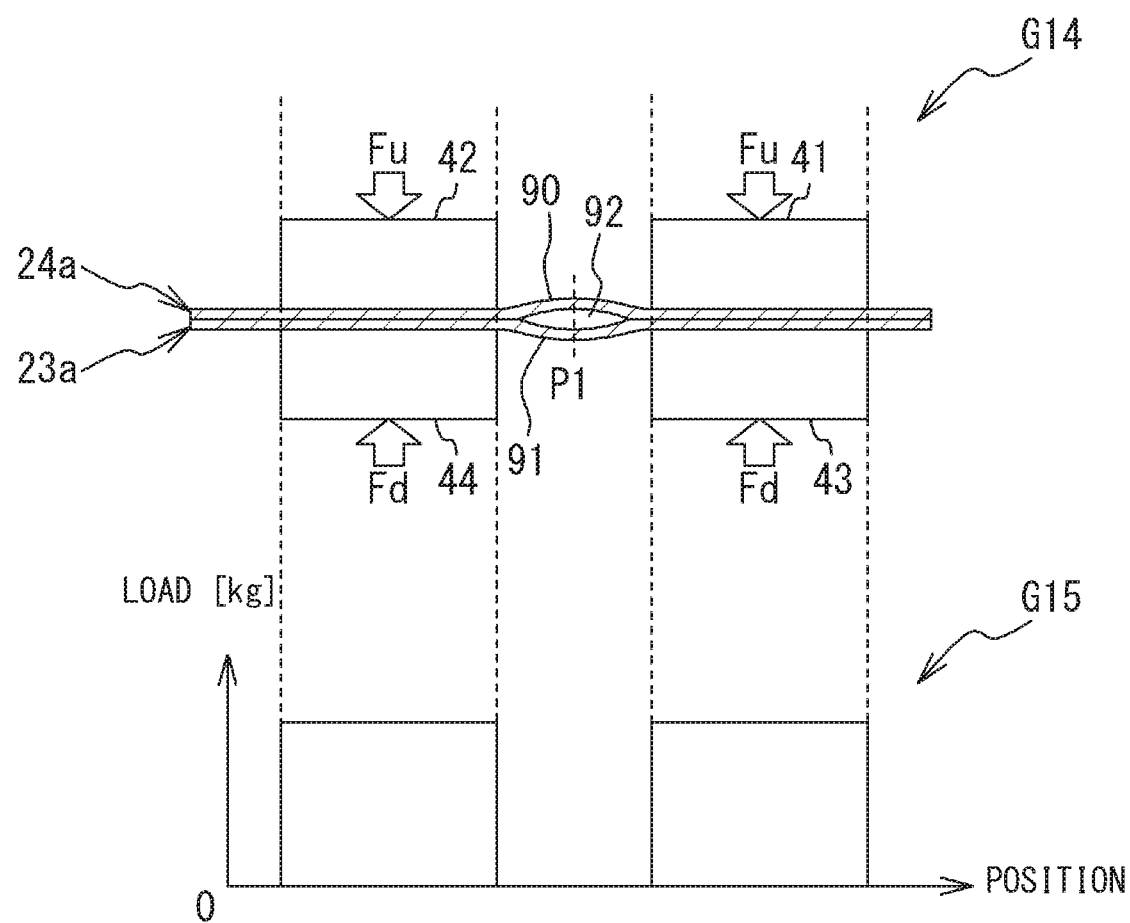
FIG. 5 illustrates a process of pressing a separator plate in a manufacturing method of a comparative example.

FIG. 5 illustrates a process of pressing separator plates 23a and 24a in a manufacturing method of a comparative example. The reference character G14 indicates the cross-sections when the separator plates 23a and 24a of the comparative example are pressed. The reference character G15 indicates the change in load (kg), which is generated between the separator plates 23a and 24a when the separator plates 23a and 24a of the comparative example are pressed, according to the position in the separator plates 23a and 24a. In addition, the reference character G13 indicates the change in load (kg), which is generated between the separator plates 23 and 24 when the protruding portions 11, 12, 31, and 32 are pressed in the manufacturing method of the embodiment, according to the position in the separator plates 23 and 24.

The separator plates 23a and 24a of the comparative example do not have any one of the protruding portions 11, 12, 31, and 32 of the separator plates 23 and 24 of the embodiment, and are practically flat. However, there are fine warpage and irregularity due to manufacturing error on the surfaces of the separator plates 23a and 24a. Thus, when the both sides of the welding parts P1 of the separator plates 23a and 24a are pressed by the pressing tools 41 through 44 from top and bottom, regions 90 and 91 (corresponding to the junction portions 10 and 30) including the welding point P1 may deform, and thereby a gap 92 may be formed.

For example, in the case of laser welding, it depends on the junction condition, but the allowable distance between the separator plates 23a and 24a at the welding point P1 is approximately 25 (μm). Thus, when the dimension of the gap 92 is greater than 25 (μm), the welding point P1 may be insufficiently joined.

In the separator plates 23a and 24a of the comparative example, uniform loads Fu and Fd are applied to the both sides of the welding point P1 as indicated by the reference character G15. Thus, no load is applied to the welding point P1. Thus, it is difficult to reduce the gap 92 in the regions 90 and 91.

In contrast, since the separator plates 23 and 24 of the embodiment have the protruding portions 11, 12, 31, and 32 adjacent to both sides of the junction portions 10 and 30, a load is applied to each of the junction portions 10 and 30 as indicated by the reference character G13 when the protruding portions 11, 12, 31, and 32 are pressed by the pressing tools 41 through 44, respectively. This is because the protruding portions 11, 12, 31, and 32 to which the loads Fu and Fd are applied from the pressing tools 41 through 44 generate forces f acting on the junction portions 10 and 30.

Accordingly, unlike the comparative example, loads are applied to the welding points P1 of the separator plates 23 and 24, and the gap between the junction portions 10 and 30 is thus reduced. In some embodiments, the loads Fu and Fd applied from the pressing tools 41 through 44 are uniform to make the point of application of the force f of the protruding portions 11, 12, 31, and 32 correspond to the welding point P1 precisely.

In addition, for example, undulation due to manufacturing error may be present along the weld line L on the contact face between the junction portions 10 and 30. In addition, undulation may be also present on the contact faces between the protruding portions 11, 12, 31, and 32 and the pressing tools 41 through 44.

It is assumed that the bent portions 14, 15, 34, and 35 are not provided and the protruding portions 11, 12, 31, and 32 are pressed. In this case, due to undulation, after a part of the junction portion 10 or 30 comes first in contact with the separator plate 24 or 23, even when a load is increased, the rigidity of the separator plates 23 and 24 prevents the remaining part of the junction portion 10 or 30 from coming in contact with the separator plate 24 or 23, and a gap may be formed in a part of the junction portion 10 or 30.

In contrast, the separator plates 23 and 24 have the bent portions 14, 15, 34, and 35 between the junction portions 10 and 30 and the protruding portions 11, 12, 31, and 32, and the bent portions 14, 15, 34, and 35 elongate and contract before and after the protruding portions 11, 12, 31, and 32 are pressed. Thus, when the protruding portions 11, 12, 31, and 32 are pressed, the bent portions 14, 15, 34, and 35 elastically deform, and thereby, the junction portions 10 and 30 are pressed against each other across the entire surface along the weld line L.

Accordingly, the junction portions 10 and 30 are able to be sufficiently joined to each other by laser welding, and the junction state between the separator plates 23 and 24 is improved. The height positions of the protruding portions 11, 12, 31, and 32 change to the positions indicated by the reference characters H and H' due to pressing by the pressing tools 41 through 44. However, after the completion of pressing, since the bent portions 14, 15, 34, and 35 recover to the state before pressing due to the elastic force, and the height positions return to original positions.

The above-described advantage is achieved by providing at least one of the bent portions 14, 15, 34, and 35. For example, the separator plate 24 may have the bent portion 14 or the bent portion 15 at only one side of the junction portion 10. However, when the bent portions 14 and 15 are located at both sides of the junction portion 10, the forces f applied to the junction portion 10 from the protruding portions 11 and 12 tend to balance due to the elastic forces of the bent portions 14 and 15. Thus, the distortion of the separator plate 24 is inhibited after the joining of the separator plates 23 and 24 and the pressing by the pressing tools 41 through 44 are completed.

Since the distortion of the separator plate 24 is inhibited, the separator plate 24 can be uniformly in contact with the MEGA 20 throughout, the contact resistance between the separator plate 24 and the MEGA 20 is thereby reduced, and the power generation performance improves. The same applies to the bent portions 34 and 35 of the separator plate 23.

In addition, in the present example, not only the separator plate 24 but also the separator plate 23 has the bent portions 34 and 35. Thus, the loads Fu of the pressing tools 41 and 42 at the separator plate 24 side and the loads Fd of the pressing tools 43 and 44 at the separator plate 23 side are easily balanced by the elastic forces of the bent portions 34 and 35. Accordingly, after the pressing by the pressing tools 41 through 44 is completed, the warpage of the separator plates 23 and 24 caused by reaction force associated with the completion of the pressing is inhibited.

In the present example, the junction portions 10 and 30 of the separator plates 23 and 24 are formed so as to have flat surfaces, but may be formed so as to have curved surfaces as described below.

Figure 6:
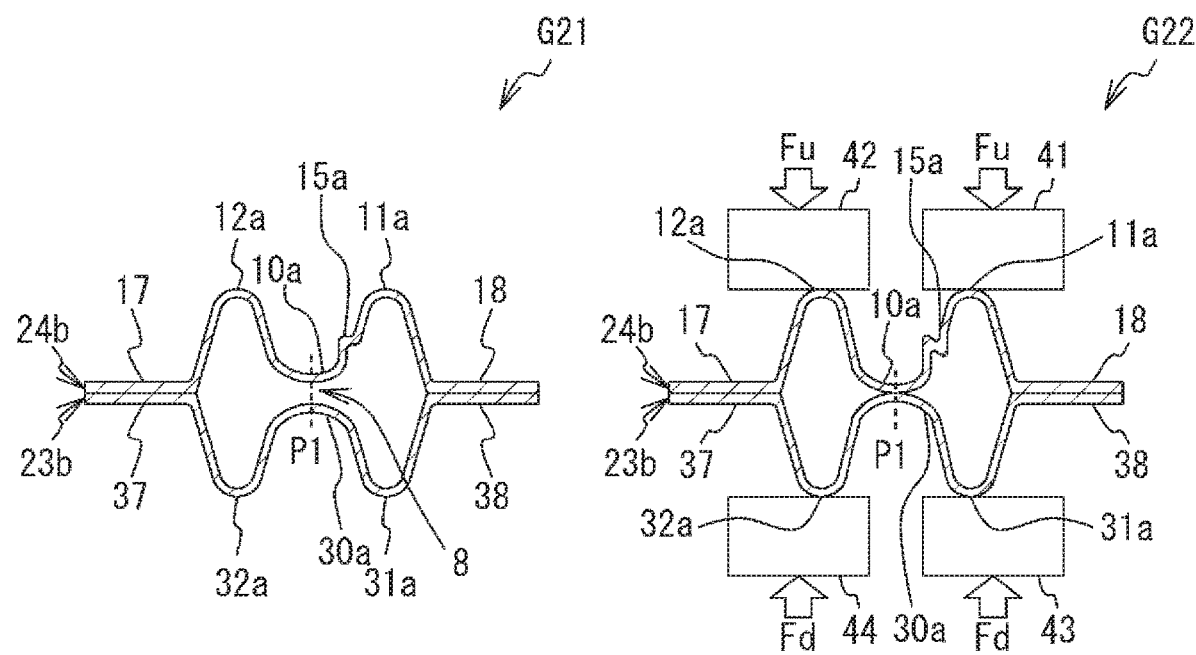
FIG. 6 is a partial cross-sectional view of a separator plate in another embodiment.

FIG. 6 is a partial cross-sectional view of separator plates 23*b* and 24*b* in another embodiment. In FIG. 6, the same reference characters are affixed to the same elements as those of FIG. 4, and the description thereof is omitted.

The separator plate 24*b* includes a junction portion 10*a* that is curved so as to protrude toward the separator plate 23*b*, protruding portions 11*a* and 12*a* adjacent to both sides of the junction portion 10*a*, and a bent portion 15*a* that is bent between the protruding portion 11*a* and the junction portion 10*a*. The protruding portions 11*a* and 12*a* protrude in a direction away from the separator plate 23*b*, and are curved.

The separator plate 23*b* includes a junction portion 30*a* that is curved so as to protrude toward the separator plate 24*b*, and protruding portions 31*a* and 32*a* adjacent to both sides of the junction portion 30*a*. The protruding portions 31*a* and 32*a* protrude in a direction away from the separator plate 24*b*, and are curved. No bent portion is located between the protruding portion 12*a* and the junction portion 10*a*, between the protruding portion 31*a* and the junction portion 30*a*, and between the protruding portion 32*a* and the junction portion 30*a*.

The reference character G21 indicates the cross-sections of the separator plates 23*b* and 24*b* before the protruding portions 11*a* and 12*a*, 31*a*, 32*a* are pressed, and the reference character G22 indicates the cross-sections of the separator plates 23*b* and 24*b* when the protruding portions 11*a* and 12*a*, 31*a*, 32*a* are pressed.

Before the protruding portions 11*a* and 12*a*, 31*a*, 32*a* are pressed, the junction portions 10*a* and 30*a* of the separator plates 24*b* and 23*b* face each other across a gap 8, and are not in contact with each other. When the protruding portions 11*a* and 12*a*, 31*a*, 32*a* are pressed, the bent portion 15*a* elastically deforms, and thereby, the junction portion 10*a* is pressed against the junction portion 30*a*.

At this time, since the junction portions 10*a* and 30*a* curve so as to protrude toward the separator plates 23*b* and 24*b*, respectively, and the contact point between the curved surfaces of the junction portions 10*a* and 30*a* correspond to the welding point P1. Thus, the area of contact between the junction portions 10*a* and 30*a* is less than the area of contact between the junction portions 10*a* and 30*a* when the junction portions 10*a* and 30*a* have flat surfaces. Accordingly, a force applied to the welding point P1 at the time of pressing increases, and thus the joint strength between the junction portions 10*a* and 30*a* by laser welding is enhanced.

When at least one of the junction portions 10*a* and 30*a* curves, the area of contact between the junction portions 10*a* and 30*a* can be reduced. Thus, the above-described advantage is also achieved. However, in the present example, when both the junction portions 10*a* and 30*a* curve, the area of contact can be easily reduced compared to the area of contact when only one of the junction portions 10*a* and 30*a* curves.

Additionally, since the protruding portions 11*a* and 12*a*, 31*a*, 32*a* also curve, the bent portion 15*a* easily elastically deforms, and the adhesiveness between the junction portions 10*a* and 30*a* is thus enhanced.

In addition, in the present example, the separator plate 23*b* do not include the bent portion 34 nor 35. However, since the junction portion 30*a* of the separator plate 23*b* is pressed against the junction portion 10*a* of the separator plate 24*b* as the protruding portions 31*a* and 32*a* are pressed, the gap between the junction portions 10*a* and 30*a* is reduced as described above.

Additionally, both the separator plates 23 and 24 illustrated in FIG. 4 have the protruding portions 11, 12, 31, and 32, but as in the following example, only one separator plate 24 may have the protruding portions 11 and 12.

Figure 7:
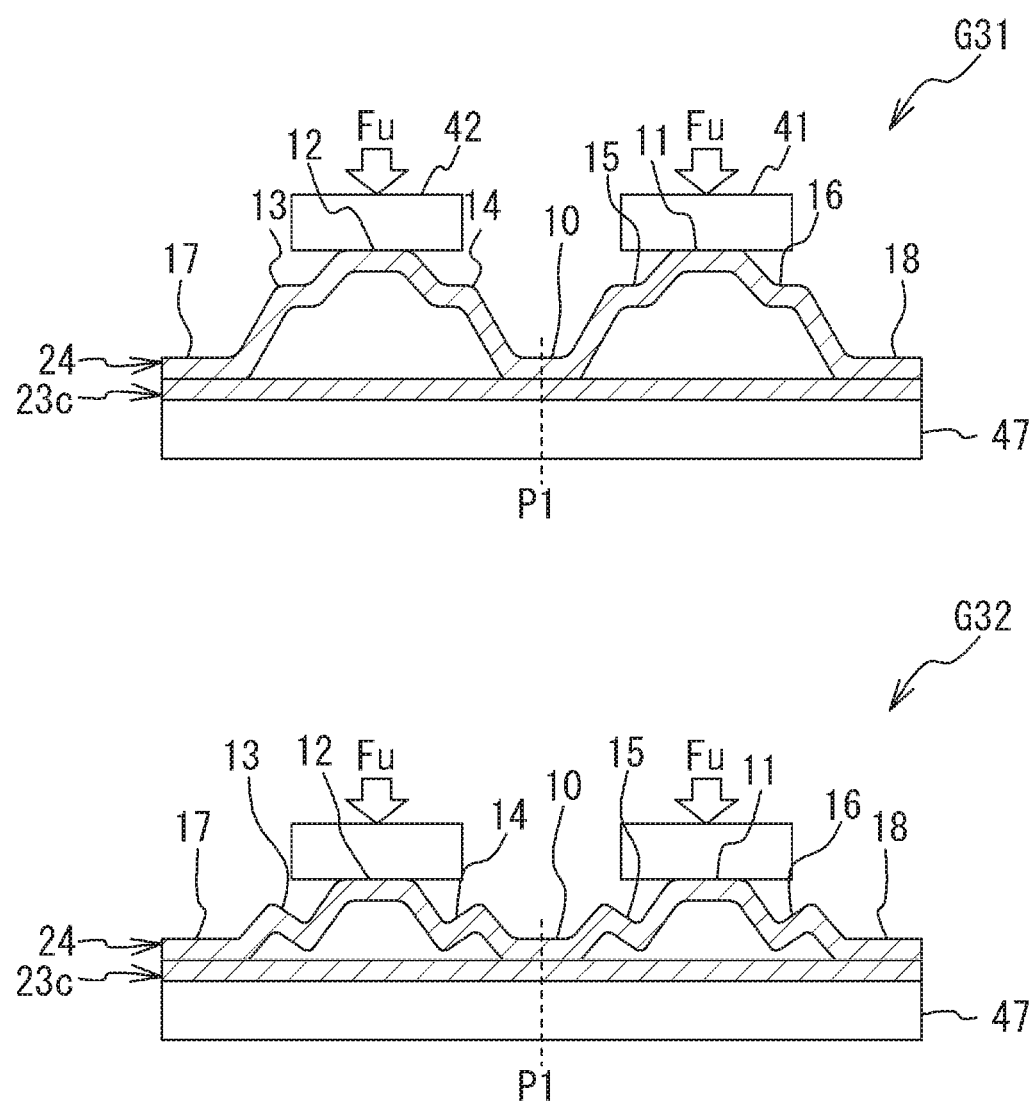
FIG. 7 is a partial cross-sectional view of a separator plate in yet another embodiment.

FIG. 7 is a partial cross-sectional view of separator plates 23*c* and 24 in yet another embodiment. Unlike the above-described embodiments, the separator plate 23*c* has a substantially flat surface, and includes none of the protruding portions 31 and 32.

The reference character G31 indicates the cross-sections of the separator plates 23*c* and 24 before the protruding portions 11 and 12 are pressed, and the reference character G32 indicates the cross-sections of the separator plates 23*c* and 24 when the protruding portions 11 and 12 are pressed.

Before the protruding portions 11 and 12 are pressed, the separator plate 23*c* is placed on a base 47, and the separator plate 24 is stacked on the separator plate 23*c* so that the protruding portions 11 and 12 protrude in a direction away from the separator plate 23*c*. The protruding portions 11 and 12 are pressed as the loads Fu are applied from the pressing tools 41 and 42. When the protruding portions 11 and 12 are pressed, the junction portion 10 of the separator plate 24 is pressed against the separator plate 23c.

At this time, as in the above-embodiments, the junction portion 10 is pressed against the separator plate 23c by elastic deformation of the bent portions 14 and 15. Thus, as described above, along the weld line L, the gap between the junction portion 10 and the separator plate 23c is reduced. Therefore, the junction portion 10 and the separator plate 23c can be sufficiently joined together by laser welding, and the junction state between the separator plates 23c and 24 is thus improved.

Although some embodiments of the present disclosure have been described in detail, the present disclosure is not limited to the specific embodiments but may be varied or changed within the scope of the present disclosure as claimed.

What is claimed is:

1. A method of manufacturing a fuel cell separator, the method comprising:
    stacking a first separator plate, a second separator plate, a first frame, a second frame, a first gas diffusion layer disposed at the first frame, and a second gas diffusion layer disposed at the second frame, the second separator plate has a first protruding portion, a second protruding portion, a fifth protruding portion, and a sixth protruding portion so that the first protruding portion, the second protruding portion, the fifth protruding portion, and the sixth protruding portion protrude in a direction away from the first separator plate, the first protruding portion and the second protruding portion being adjacent to both sides of a first junction portion to be joined to the first separator plate, the fifth protruding portion and the sixth protruding portion being adjacent to both sides of a third junction portion to be joined to the first separator plate, the first protruding portion and the second protruding portion being in contact with the first frame, the fifth protruding portion and the sixth protruding portion being in contact with the first gas diffusion layer, the first separator plate includes a third protruding portion, a fourth protruding portion, a seventh protruding portion, and an eighth protruding portion, the third protruding portion and the fourth protruding portion are adjacent to both sides of a second junction portion to be joined to the first junction portion, the seventh protruding portion and the eighth protruding portion are adjacent to both sides of a fourth junction portion to be joined to the third junction portion, the third protruding portion and the fourth protruding portion being in contact with the second frame, the seventh protruding portion and the eighth protruding portion being in contact with the second gas diffusion layer, the second frame being disposed such that the first separator plate and the second separator plate are positioned between the first frame and the second frame;
    pressing the first protruding portion, the second protruding portion, the fifth protruding portion, and the sixth protruding portion toward the first separator plate so that the first junction portion and the third junction portion are pressed against the first separator plate; and
    joining the first junction portion and the third junction portion to the first separator plate while the first junction portion and the third junction portion are being pressed against the first separator plate, wherein
    in the pressing, the first junction portion is pressed against the first separator plate by elastic deformation of a first bent portion that is bent between the first junction portion and the first protruding portion, the first bent portion includes a first surface and an opposite second surface, the first surface and the second surface contracting, in response to the pressing, along a stacking direction in which the first separator plate and the second separator plate are stacked,
    and further in the pressing, the third junction portion is pressed against the first separator plate by elastic deformation of a second bent portion that is bent between the third junction portion and the fifth protruding portion, the second bent portion includes a third surface and an opposite fourth surface, the third surface and the fourth surface contracting, in response to the pressing, along the stacking direction.

2. The method according to claim 1, wherein
in the pressing, the first junction portion is pressed against the first separator plate by elastic deformation of a third bent portion that is bent between the first junction portion and the second protruding portion.

3. The method according to claim 1, wherein
the pressing includes pressing the first protruding portion and the second protruding portion by pressing rigid bodies against the first protruding portion and the second protruding portion.

4. The method according to claim 1, wherein
the first junction portion curves so as to protrude toward the first separator plate.

5. The method according to claim 1, wherein
the stacking includes stacking the first separator plate and the second separator plate so that the third protruding portion and the fourth protruding portion protrude in a direction away from the second separator plate,
the joining includes joining the first junction portion to the second junction portion, and
the pressing includes pressing the third protruding portion and the fourth protruding portion toward the second separator plate so that the second junction portion is pressed against the first junction portion, the second junction portion being pressed against the second separator plate by elastic deformation of a fourth bent portion that is bent between the second junction portion and the third protruding portion.

6. The method according to claim 5, wherein
in the pressing, the second junction portion is pressed against the second separator plate by elastic deformation of a fifth bent portion that is bent between the second junction portion and the fourth protruding portion.

7. The method according to claim 5, wherein
the pressing includes pressing the third protruding portion and the fourth protruding portion by pressing rigid bodies against the third protruding portion and the fourth protruding portion.

8. The method according to claim 5, wherein
the second junction portion curves so as to protrude toward the second separator plate.

9. The method according to claim 1, wherein
the joining includes joining the first junction portion to the first separator plate by welding.

10. The method according to claim 9, wherein
the joining includes joining the first junction portion to the first separator plate by laser welding.

11. The method according to claim 1, wherein the third protruding portion and the fourth protruding portion are asymmetrical to the first protruding portion and the second protruding portion.

12. The method according to claim 11, wherein the seventh protruding portion and the eighth protruding portion are asymmetrical to the third protruding portion and the fourth protruding portion.

\* \* \* \* \*